(12) United States Patent
Engstrand

(10) Patent No.: US 7,348,542 B2
(45) Date of Patent: Mar. 25, 2008

(54) SYSTEM AND METHOD FOR DETECTING AN INTENSITY OF LIGHT

(75) Inventor: Bradley Engstrand, Hartford, WI (US)

(73) Assignee: Phaedrus, LLC, Hartford, WI (US)

( * ) Notice: Subject to any disclaimer, the term of this patent is extended or adjusted under 35 U.S.C. 154(b) by 0 days.

(21) Appl. No.: 11/455,322

(22) Filed: Jun. 19, 2006

(65) Prior Publication Data

US 2007/0075229 A1    Apr. 5, 2007

Related U.S. Application Data

(63) Continuation-in-part of application No. 11/242,799, filed on Oct. 3, 2005, now Pat. No. 7,294,823.

(51) Int. Cl.
*G01D 5/34* (2006.01)
*F01B 25/26* (2006.01)

(52) U.S. Cl. .......................... 250/231.1; 91/1

(58) Field of Classification Search ...............
250/231.1–231.18, 573, 239; 92/5 R; 91/1; 73/119 A; 340/870.31
See application file for complete search history.

(56) References Cited

U.S. PATENT DOCUMENTS

| | | |
|---|---|---|
| 3,368,751 A | 2/1968 | Merrill |
| 3,885,875 A | 5/1975 | Howe, Jr. et al. |
| 4,150,299 A | 4/1979 | Kasiewicz et al. |
| 4,501,642 A | 2/1985 | Wells |
| 4,661,695 A | 4/1987 | Mori et al. |
| 4,736,674 A | 4/1988 | Stoll |
| 4,806,707 A | 2/1989 | Landmeier |
| 4,902,903 A | 2/1990 | Segerson et al. |

(Continued)

OTHER PUBLICATIONS

U.S. Appl. No. 11/238,893, filed Sep. 29, 2005, Engstrand.

(Continued)

*Primary Examiner*—Kiesha L. Rose
*Assistant Examiner*—Jennifer Bennett
(74) *Attorney, Agent, or Firm*—Patents & TMS, P.C.

(57) ABSTRACT

A system and a method detect an intensity of light within an interior of a compartment and/or of an end cap to locate a position of a movable element within the interior of the compartment. A platform is attached to interior walls of the end cap for positioning a light source within the interior of the compartment and a first light detector within the interior of the end cap. A second light detector is attached to the interior walls of the end cap which is adjacent to the platform. The platform is located between the light source and the first light detector and/or the second light detector to prevent light transmitted by the light source from being directed inwardly with respect to the first light detector and/or the second light detector. A bottom surface of the end cap reflects or diffuses light within the interior of the end cap inwardly with respect to the first light detector and/or the second light detector. The first light detector and/or the second light detector measures and detects the intensity of the light within the interior of the end cap which was attenuated by the movable element and/or by the interior walls of the compartment. The intensity of the light detectable by the first light detector and/or by the second light detector corresponds to the position of the movable element within the interior of the compartment.

19 Claims, 6 Drawing Sheets

U.S. PATENT DOCUMENTS

| | | | |
|---|---|---|---|
| 4,962,395 A * | 10/1990 | Baird | 340/619 |
| 4,970,361 A | 11/1990 | Fuse | |
| 5,182,979 A | 2/1993 | Morgan | |
| 5,231,959 A | 8/1993 | Smietana | |
| 5,271,505 A | 12/1993 | Low | |
| 5,705,742 A | 1/1998 | Fox et al. | |
| 5,744,705 A | 4/1998 | Derouen et al. | |
| 5,799,629 A | 9/1998 | Lowi, Jr. | |
| 5,977,778 A | 11/1999 | Chan et al. | |
| 5,988,676 A | 11/1999 | Lotito et al. | |
| 6,058,776 A | 5/2000 | Algers et al. | |
| 6,180,955 B1 * | 1/2001 | Doggett et al. | 250/586 |
| 6,484,620 B2 * | 11/2002 | Arshad et al. | 92/5 R |
| 6,952,009 B1 | 10/2005 | Engstrand | |
| 2004/0089797 A1 | 5/2004 | Engstrand | |
| 2006/0065822 A1 | 3/2006 | Engstrand | |

OTHER PUBLICATIONS

U.S. Appl. No. 11/394,712, Mar. 31, 2006, Engstrand.

* cited by examiner

SYSTEM AND METHOD FOR DETECTING AN INTENSITY OF LIGHT

This application is a Continuation-In-Part Application of U.S. patent application Ser. No. 11/242,799 filed on Oct. 3, 2005 now U.S. Pat. No. 7,294,823.

BACKGROUND OF THE INVENTION

The present invention generally relates to a system and a method for detecting an intensity of light. More specifically, the present invention relates to a system and a method for detecting an intensity of light within a compartment via a first light detector and/or a second light detector. The first light detector and/or the second light detector may be located within an interior of an end cap which may be adjacent to an interior of the compartment. A platform may be connected to interior walls of the end cap for supporting a light source and/or the first light detector. The platform may be located between the interior of the end cap and/or the interior of the compartment for positioning the light source within the interior of the compartment. The second light detector may be connected to the interior walls of the end cap and/or may be adjacent to the platform for positioning the second light detector within the interior of the end cap. The light source may transmit light into the interior of the compartment for determining a position of a movable element within the interior of the compartment. The platform may prevent the light transmitted by the light source from being directed towards the first light detector and/or towards the second light detector. In an embodiment, a cover may be applied to a portion of the light source to prevent light transmitted by the light source from being directed towards the first light detector and/or the second light detector.

The interior walls of the compartment may absorb, may diffuse, may attenuate and/or may scatter an amount of the light which may be transmitted from the light source. The amount of the emitted light which may be absorbed, may be diffused, may attenuate and/or may be scattered by the interior walls of the compartment may correspond to a position of the movable element within the interior of the compartment. A surface of the movable element may absorb, may diffuse, may attenuate and/or may scatter an amount of the light which may be transmitted from the light source. The first light detector and/or the second light detector may measure an intensity of the light within the interior of the compartment and/or within the interior of the end cap which may not have been absorbed, may have been diffused and/or may have been scattered by the interior walls of the compartment and/or by the surface of the movable element. As a result, the interior walls of the compartment and/or the surface of the movable element may minimize diffraction of the light within the interior of the compartment.

The intensity of emitted light within the interior of the compartment and/or within the interior of the end cap may be reflected towards the first light detector and/or the second light detector via a bottom surface of the end cap. As a result, the first light detector and/or the second light detector may detect the intensity of the emitted light within the interior of the compartment and/or within the interior of the end cap which may correspond to the position of the movable element within the interior of the compartment.

It is, of course, generally known to measure and/or to detect a position of a movable element within an interior of a cylinder. The first position of the movable element in the interior of the cylinder may correspond to a first location of a machine element which may be connected to and/or may be attached to the movable element. Typically, a first sensor within the interior of the cylinder may be located at a first location within the interior of the cylinder. The first location of the first sensor may be adjacent to the first position of the movable element. The first sensor must physically contact and/or must magnetically interfere with the movable element to detect that the movable element is in the first position within the interior of the cylinder. A second position of the movable element within the interior of the cylinder may correspond to a second position of the machine element with respect to the cylinder. A second sensor within the interior of the cylinder may be at a second located within the interior of the cylinder. The second location of the second sensor may adjacent to the second position of the movable element. The second sensor must physically contact and/or may magnetically interfere with the movable element to detect that the movable element may be in the second position within the interior of the cylinder. As a result, the first sensor and the second sensor must physically contact and/or must magnetically interfere with the movable element to detect that the movable element has moved between the first position and the second position within the interior of the cylinder.

However, physical contact between the movable element and the first sensor and/or the second sensor may cause the first sensor and/or the second sensor, respectively, to inaccurately detect the first position and/or the second position of the movable element within the interior of the cylinder. Further, physical contact between the movable element and the first sensor and/or the second sensor may damage and/or may destroy the movable element, the first sensor and/or the second sensor. As a result, the first sensor and/or the second sensor may be inoperable or may inaccurately detect the first position and/or the second position of the movable element within the interior of the cylinder.

Additionally, the movable element may be made from a material which may not exhibit magnetic properties for interfering with the first sensor and/or the second sensor. For example, the movable element may be made from glass which may prevent the first sensor and/or the second sensor from magnetically interfering with the movable element to detect that the movable element is at the first position or at the second position within the interior of the cylinder. As a result, the first sensor and/or the second sensor may be incapable of detecting that the movable element has moved between the first position and the second position within the interior of the cylinder.

A need, therefore, exists for a system and a method for detecting an intensity of light. Additionally, a need exists for a system and a method for detecting an intensity of light within an interior of a compartment via a first sensor and/or a second sensor which may be located in an interior of an end cap adjacent to the compartment. Further, a need exists for a system and a method for detecting an intensity of light which may provide a platform attachable to interior walls of an end cap for positioning a light source within an interior of the compartment. Still further, a need exists for a system and a method for detecting an intensity of light which may provide a platform attachable to interior walls of an end cap for positioning a first light detector within an interior of the end cap. Moreover, a need exists for a system and a method for detecting an intensity of light which may provide a platform attachable to interior walls of an end cap to prevent light transmitted by a light source from being direct towards a first light detector and/or a second light detector. Furthermore, a need exists for a system and a method for detecting an intensity of light which may provide a first light detector and/or a second light detector within an interior of an end cap to detect an intensity of light within the end cap for determining a position of a movable element within the compartment.

SUMMARY OF THE INVENTION

The present invention provides a system and a method for detecting an intensity of light. Moreover, the present invention provides a system and a method for detecting an intensity of light within a compartment via a first light detector and/or a second light detector which may be located within an interior of an end cap adjacent to an interior of the compartment. A light source and the first light detector may be connected to a platform which may be attached to interior walls of the end cap. The second light detector may be connected to the interior walls of the end cap adjacent to the platform. The platform may prevent and/or may block light transmitted by the light source from being directed towards the first light detector and/or the second light detector. Further, the platform may reduce, may minimize and/or may prevent diffraction of the light within the interior of the compartment.

Interior walls of the compartment and/or a surface of a movable element within the interior of the compartment may absorb, may diffuse, may attenuate and/or may scatter an amount of the light transmitted by the light source which may correspond to a position of the movable element within the interior of the compartment. As a result, the interior walls of the compartment and/or the surface of the movable element may reduce, may minimize and/or may prevent diffraction of the light within the interior of the compartment. A bottom surface of the end cap may reflect the light within the interior of the end cap inwardly with respect to the first light detector and/or the second light detector. The first light detector and/or the second light detector may detect the intensity of light within the interior of the end cap which may not have been absorbed by, may have be diffused and/or may have been attenuated by the interior walls of the compartment and/or by the surface of the movable element. The intensity of light detected by the first light detector and/or the second light detector may correspond to the position of the movable element within the interior of the compartment.

To this end, in an embodiment of the present invention, a system for detecting light is provided. The system has a compartment having a body defining an interior wherein the body has an interior surface and a length defined between a first end and a second end of the compartment. Additionally, the system has a cap having bottom surface and walls defining an interior of the cap wherein the walls are connected to the bottom surface wherein the end cap is connected to the first end of the compartment wherein the interior of the compartment is adjacent to the interior of the cap. Further, the system has a light source connected to the walls of the cap wherein the light source is located within the interior of the compartment wherein the light source emits light into the interior of the compartment wherein the interior surface of the compartment absorbs and diffuses an amount of the light emitted from the light source within the interior of the compartment. Moreover, the system has a a first detector connected to the walls of the cap wherein the first detector detects an intensity of the light within the interior of the cap wherein the intensity of the light within the interior of the cap corresponds to an intensity of the light within the interior of the compartment which is absorbed and diffused by the interior surface of the compartment and further wherein the intensity of the light with the interior of the compartment corresponds to the amount of the light absorbed and diffused by the interior surface of the compartment wherein the cap and the compartment prevents diffraction of the light within the interior of the compartment and the interior of the cap.

In an embodiment, the system has a movable element within the interior of the compartment wherein a position of the movable element within the interior of the compartment corresponds to the intensity of the light detected by the first sensor.

In an embodiment, the system has a second detector connected to the walls of the cap wherein the second detector measures the intensity of the light within the interior of the cap.

In an embodiment, the system has a platform attached to the walls of the cap wherein the platform is located between the interior of the compartment and the interior of the cap wherein the platform prevents diffraction of the light within the compartment and the cap.

In an embodiment, the bottom surface reflects the light within the interior of the cap inwardly with respect to the first detector.

In an embodiment, the system has a microprocessor connected to the first detector wherein the microprocessor is in communication with the first detector.

In an embodiment, the system has a coating on the interior surface of the compartment wherein the light absorbing coating absorbs or diffuses the amount of the light emitted from the light source.

In another embodiment of the present invention, a system for detecting light is provided. The system has a compartment having a body defining an interior wherein the body has an interior surface and a length defined between a first end and a second end of the compartment wherein the compartment has a movable element within the interior of the compartment wherein the movable element moves within the interior of the compartment from a first position to a second position wherein the interior surface prevents diffraction of light emitted within the interior of the compartment. Additionally, the system has a cap having bottom surface and walls defining an interior of the cap wherein the walls are connected to the bottom surface wherein the cap is connected to the first end of the compartment wherein the bottom surface of the cap diffuses the light emitted within the interior of the cap. Further, the system has a first detector connected to the walls of the cap wherein the first detector is located within the interior of the cap. Moreover, the system has a second detector connected to the walls of the cap wherein the second detector is located within the interior of the cap wherein the first detector or the second detector detects an intensity of the light within the interior of the cap wherein the intensity of the light within the interior of the cap corresponds to the first position or the second position of the movable element within the interior of the cap.

In an embodiment, the system has a surface formed on the movable element wherein the surface absorbs or diffuses an amount of light within the interior of the compartment.

In an embodiment, the system has a platform attached to the walls of the cap wherein the platform is located between the interior of the compartment and the first detector or the second detector.

In an embodiment, the bottom surface reflects or diffuses the light within the interior of the cap inwardly with respect to the first detector or the second detector.

In an embodiment, the system has a light source connected to the walls of the cap wherein the light source emits light within the interior of the compartment.

In an embodiment, the system has a coating on the interior surface of the compartment wherein the coating absorbs and diffuses the amount of the light emitted from the light source.

In an embodiment, the second detector is attached to the walls of the cap wherein the second detector is located between the interior of the compartment and the bottom surface of the cap.

In another embodiment of the present invention, a method for detecting light is provided. The method has the step of providing a compartment having a body defining an interior wherein the body has an interior surface and a length defined between a first end and a second end. Additionally, the method has the step of positioning a movable element within the interior of the compartment wherein the movable element is located at a first position within the interior with respect to the wall wherein the movable element and the interior surface of the compartment attenuate light emitted within the interior of the compartment. Further, the method has the step of connecting a cap to the first end of the compartment wherein the cap has a bottom surface and walls defining an interior of the cap wherein the bottom surface of the cap reflects light within the interior of the compartment wherein the walls of the cap diffuse light emitted within the interior of the cap. Moreover, the method has the step of detecting an intensity of the light within the interior of the cap wherein the intensity of the light corresponds to an amount of light absorbed and diffused by the interior surface of the compartment wherein the amount of light absorbed and diffused by the interior surface of the compartment corresponds to the first position of the movable element within the interior of the compartment.

In an embodiment, the method has the step of connecting a light detector to the walls of the cap wherein the bottom surface of the cap reflects or diffuses the light within the interior of the cap inwardly with respect to the light detector.

In an embodiment, the method has the step of moving the movable element from the first position to a second position with respect to the interior of the compartment.

In an embodiment, the method has the step of connecting a light source to the walls of the cap wherein the light source emits light within the interior of the compartment.

In an embodiment, the method has the step of attaching a platform to the walls of the cap wherein the platform is located between the interior of the compartment and the interior of the cap.

In an embodiment, the method has the step of forming a surface on the interior surface of the compartment or the movable element wherein the surface attenuates the light emitted within the interior of the compartment.

It is, therefore, an advantage of the present invention to provide a system and a method for detecting an intensity of light.

Another advantage of the present invention is to provide a system and a method for detecting an intensity of light which may provide an end cap for positioning one or more light detectors adjacent to an interior of a compartment to detect the intensity of light within the interior of the compartment.

And, another advantage of the present invention is to provide a system and a method for detecting an intensity of light which may detect a position of a movable element within an interior of a compartment which may correspond to an intensity of light within an interior of the compartment and/or within an interior of an end cap.

Yet another advantage of the present invention is to provide a system and a method for detecting an intensity of light which may provide a platform attachable to interior walls of an end cap for positioning one or more light detectors within an interior of the end cap.

A further advantage of the present invention is to provide a system and a method for detecting an intensity of light which may eliminate physical contact with a movable element within an interior of a compartment to prevent damage to and/or to prevent destruction to the movable element.

Moreover, an advantage of the present invention is to provide a system and a method for detecting an intensity of light which may determine a position of a movable element within an interior of a compartment from an intensity of light within the interior of the compartment and/or within an interior of an end cap.

And, another advantage of the present invention is to provide a system and a method for detecting an intensity of light which may attach a platform to interior walls of an end cap for position a light source within an interior of a compartment to determine a position of a movable element within the interior of the compartment.

Yet another advantage of the present invention is to provide a system and a method for detecting an intensity of light which may attach a platform to interior walls of an end cap for preventing light transmitted by a light source from being directed inwardly with respect to one or more light detectors.

Another advantage of the present invention is to provide a system and a method for detecting an intensity of light which may provide a bottom surface of an end cap for reflecting light within an interior of the end cap inwardly with respect to one or more light detectors within the interior of the end cap.

Yet another advantage of the present invention is to provide a system and a method for detecting an intensity of light which may locate a position of a movable element within an interior of a compartment from an intensity of light which may not be absorbed, may be diffused and/or may be scattered by interior walls of the compartment and/or a surface of the movable element.

A still further advantage of the present invention is to provide a system and a method for detecting an intensity of light which may provide a platform located between a light source and one or more light detectors within an end cap to reduce, to minimize and/or to prevent diffraction of light within a compartment.

Moreover, an advantage of the present invention is to provide a system and a method for detecting an intensity of light which may move and/or may drive a movable element inwardly or outwardly with respect to a light source and/or one or more light detectors.

And, another advantage of the present invention is to provide a system and a method for detecting an intensity of light which may provide interior walls of a compartment to absorb, to diffuse, to attenuate and/or to scatter light within an interior of the compartment.

Yet another advantage of the present invention is to provide a system and a method for detecting an intensity of light which may provide a surface on a movable element to absorb, to diffuse, to attenuate and/or to scatter light within an interior of a compartment.

Another advantage of the present invention is to provide a system and a method for detecting an intensity of light which may provide interior walls of the compartment and/or a surface of a movable element to reduce, to minimize and/or to prevent diffraction of light within an interior of the compartment.

Yet another advantage of the present invention is to provide a system and a method for detecting an intensity of light which may apply a cover to a portion of a light source for preventing light transmitted by the light source from being directed at one or more light detectors.

A still further advantage of the present invention is to provide a system and a method for detecting an intensity of light which may provide interior walls of a compartment, a movable element and/or a platform to attenuate light emitted within the interior of the compartment.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to a system and a method for detecting an intensity of light. More specifically, the present invention relates to a system and method for detecting an intensity of light within an interior of a compartment and/or of an end cap to locate a position of a movable element within the interior of the compartment. A platform may be attached to interior walls of the end cap for positioning a light source within the interior of the compartment and a first light detector within the interior of the end cap. A second light detector may be attached to the interior walls of the end cap which may be adjacent to the platform. The platform may be located between the light source and the first light detector and/or the second light detector to prevent light transmitted by the light source from being directed inwardly with respect to the first light detector and/or the second light detector. Further, the platform may reduce and/or may prevent diffraction of the light within the interior of the compartment.

A bottom surface of the end cap may reflect light within the interior of the end cap inwardly with respect to the first light detector and/or the second light detector. The first light detector and/or the second light detector may measure the intensity of the light within the interior of the end cap which may not have been absorbed by, may have been diffused by and/or may have been scattered by the movable element and/or by the interior walls of the compartment. As a result, the movable element and/or the interior walls of the compartment may attenuate light within the interior of the compartment. The intensity of the light detectable by the first light detector and/or by the second light detector may correspond to the position of the movable element within the interior of the compartment. As a result, the first light detector and/or the second light detector may determine the position of the movable element within the compartment via the intensity of light within the end cap which may not have been absorbed by interior walls of the compartment and/or by the movable element.

Figure 1:
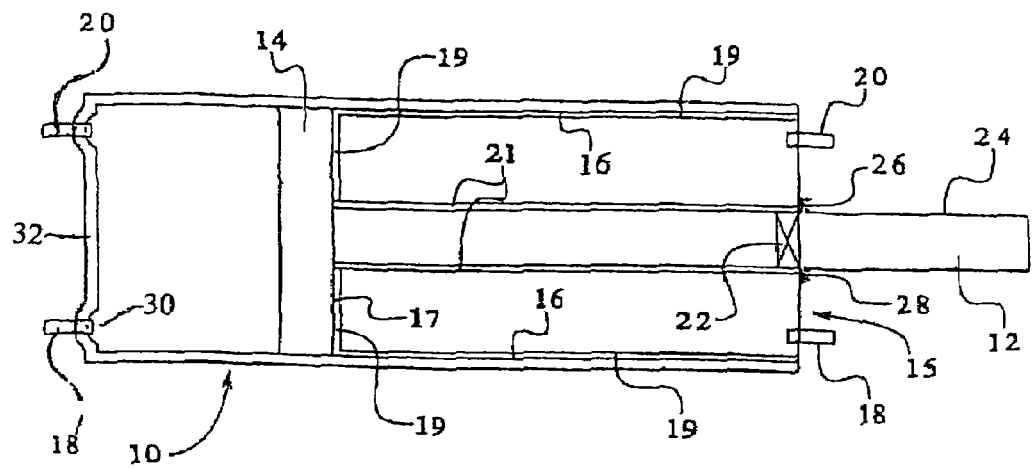
FIG. 1 illustrates a cross-sectional view of a cylinder showing sensor placement and cleaning elements of an embodiment of the present invention.

Referring now to the drawings wherein like numerals refer to like parts, FIG. 1 illustrates a cylinder machine element 10 having a shaft element 12 and a head 14 that operates cooperatively with the cylinder 10 in a manner well-known to one of ordinary skill in the art. The cylinder 10 may preferably be hydraulic or pneumatic. The cylinder 10 may also be any other type of cylinder known to one of ordinary skill in the art.

The cylinder 10 further may have an end wall 15 that may be perpendicular to the shaft 12 and that may substantially enclose the cylinder 10. The end wall 15 may surround the shaft 12. A light source 18 may be positioned on the end wall 15 of the cylinder 10 with the light from the light source 18 projecting into the interior of the cylinder 10. The light source 18 may be an LED light source or any other light source known by those skilled in the art. In addition, a light sensor 20 may also be placed on the end wall 15 of the cylinder 10 with the detecting portion of the sensor 20 directed towards the interior of the cylinder 10. The light sensor 20 measures the intensity of light within the cylinder 10 emitted by the light source 18 into the interior of the cylinder 10.

The cylinder 10 has an interior wall 16. The interior wall 16 may be coated with a substance 19 that may absorb, may diffuse and/or may scatter a portion of the light emitted from the light source 18. The substance 19 may be an anodizing compound. The substance 19 may reduce, may minimize and/or may prevent diffraction of the light emitted from the light source 18. The surface 17 of the head 14 may also be coated with the substance 19 or may be covered with a nitrile compound or other coating known by those skilled in the art to be light absorbing. Furthermore, the surface 24 of the shaft 12 may also be coated with a light absorbing substance 21 such as a nitrile compound, ceramic compound, or any other compound known by those skilled in the art to be coated onto a shaft that may also provide light absorbing, light diffusing, light attenuating and contaminant preventative properties. The substances 19, 21 may have various colors that may affect and/or control the amount of light absorption.

As the head 14 and the shaft 12 transpose through the cylinder 10, a portion of the light emitted from the light source 18 may be absorbed by the coating 19 on the interior wall 16. A portion of the light emitted by the light source 18 may be absorbed, may be diffused, may be attenuated and/or may be scattered by the coating 19, 21 on the head surface 17. Lastly, a portion of the light emitted by the light source 18 may be absorbed, may be diffused, may be attenuated and/or may be scattered by the coating 21 on the shaft surface 24. The light sensor 20 measures the intensity of light within the interior of the cylinder 10 that is not absorbed by, is diffused and/or is attenuated by the coatings 19, 21. The light sensor 20 may then transmit a signal indicative of the intensity to a processor 104, represented in FIG. 2. The processor 104 may be programmed to translate the measured intensity of the light emitted by the light source 18 that is within the cylinder 10 into a position measurement of the head 14 or shaft 12 within the cylinder 10.

In an alternate embodiment of the present invention, the cylinder 10 may have a groove 30 within an interior of an opposing end wall 32. Located within the groove 30 may be an additional light source 18 and/or an additional sensor 20. An advantage of placing the additional light source 18 and the additional sensor 20 within the groove may be to prevent the shaft element 12 and the head 14 from closing off the light path as the shaft element 12 and the head 14 move throughout the cylinder. A further advantage of placing the additional light source 18 and the additional sensor 20 within the opposing end wall 32 may be to obtain an average of two sensor readings which may provide greater accuracy in position measurement. In addition, the groove 30 may also be placed within the end wall 15 with the light source 18 and the sensor 20 placed within the groove 30.

Figure 2:
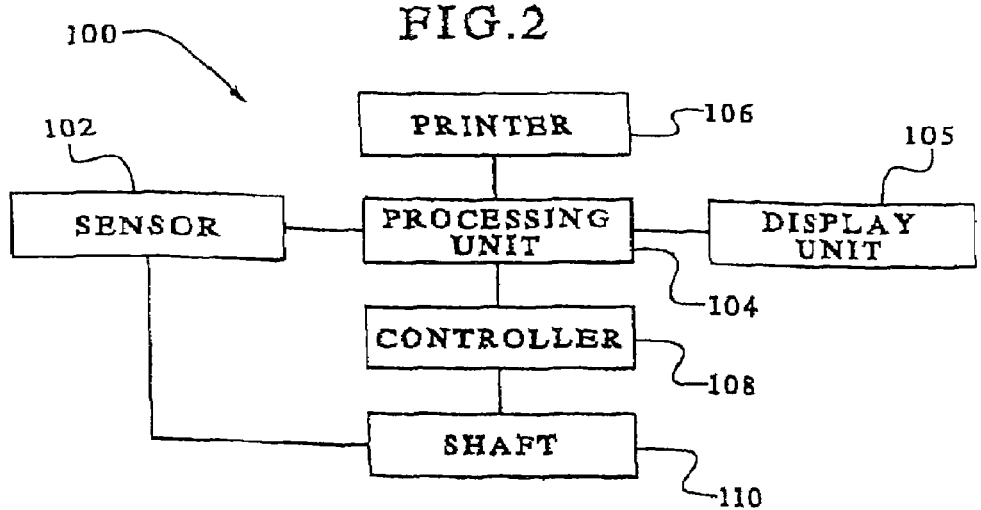
FIG. 2 illustrates a black box diagram of an embodiment of the system of the present invention.

FIG. 2 illustrates, in a black box diagram, an embodiment of a system 100 of the present invention. The system 100 includes a sensor 102 which may detect the intensity of light emitted by the light source 18 within the interior of the cylinder 10 that is not absorbed by, that is diffused by and/or that is attenuated by the coatings 19, 21 within the system 100. An output signal from the sensor 102 may be transmitted to the processor 104 for signal interpretation and/or processing. The processor 104 may determine the position of the shaft 12 or head 14 within the cylinder 10.

A display unit 105 may be provided to display the absolute or relative position of the sensed shaft 12. A printer 106 may also be provided to print the results of the absolute or relative position of the shaft 12. The processor 104 may be connected to a controller 108. After the output signal of the sensor 102 is processed by the processor 104, a signal may be transmitted to the controller 108. The controller 108 may then adjust the position of a machine element 110, such as a valve, which may affect the movement of the shaft 12 within the cylinder 10. The new position of the shaft 12 may provide the sensor 102 with a subsequent measurement which may eventually be processed by the processor 104 and may determine whether the machine element 110 may be adjusted to affect the position of the shaft 12 within the cylinder 10.

FIG. 1 also illustrates a seal 22 which may be engaged onto the shaft 12. The seal 22 may be positioned near the end wall 15 of the cylinder 10. The seal 22 may be made from, for example, rubber. A first brush 26 may be positioned near the end wall 15 of the cylinder 10 as illustrated in FIG. 1. The first brush 26 may be a wire brush, preferably made from, for example, steel or any other metal or other material known by one of ordinary skill in the art. A second brush 28 may also be positioned near the end wall 15 of the cylinder 10 diametrically opposed to the first brush 26. The second brush may be made from, for example, bronze or any other metal or other material known by one of ordinary skill in the art.

The first brush 26 and the second brush 28 may be in contact with the surface 24 of the shaft 12. As the shaft 12 moves laterally through the cylinder 10, the first brush 26 and the second brush 28 may scrape contaminants, such as weld spatter, which may be deposited onto the surface 24 of the shaft 12. By scraping contaminants from the shaft 12, the first brush 26 and the second brush 28 allow the shaft 12 to move more efficiently through the cylinder, thus providing more accurate position measurements. The coating 21 on the surface 24 of the shaft 12 may be a nitrile coating, a ceramic coating or any other coating known by those skilled in the art capable of light absorption, of light diffusing and/or of light attenuation and also capable of preventing and/or reducing the accumulation of contaminants onto a surface 24 of the shaft 12.

Figure 3:
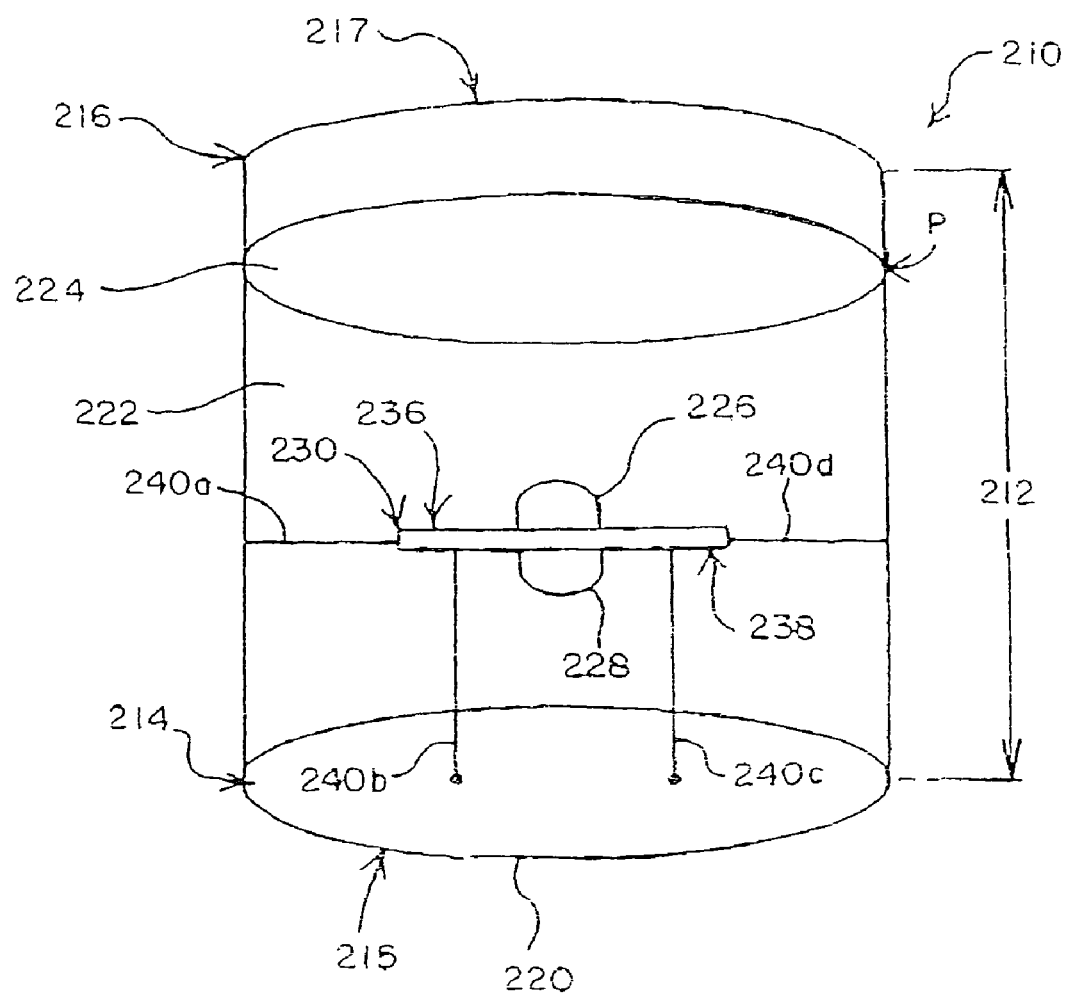
FIG. 3 illustrates a perspective view of a compartment with a movable element, a light source and a light sensor in an embodiment of the present invention.
Figure 4:
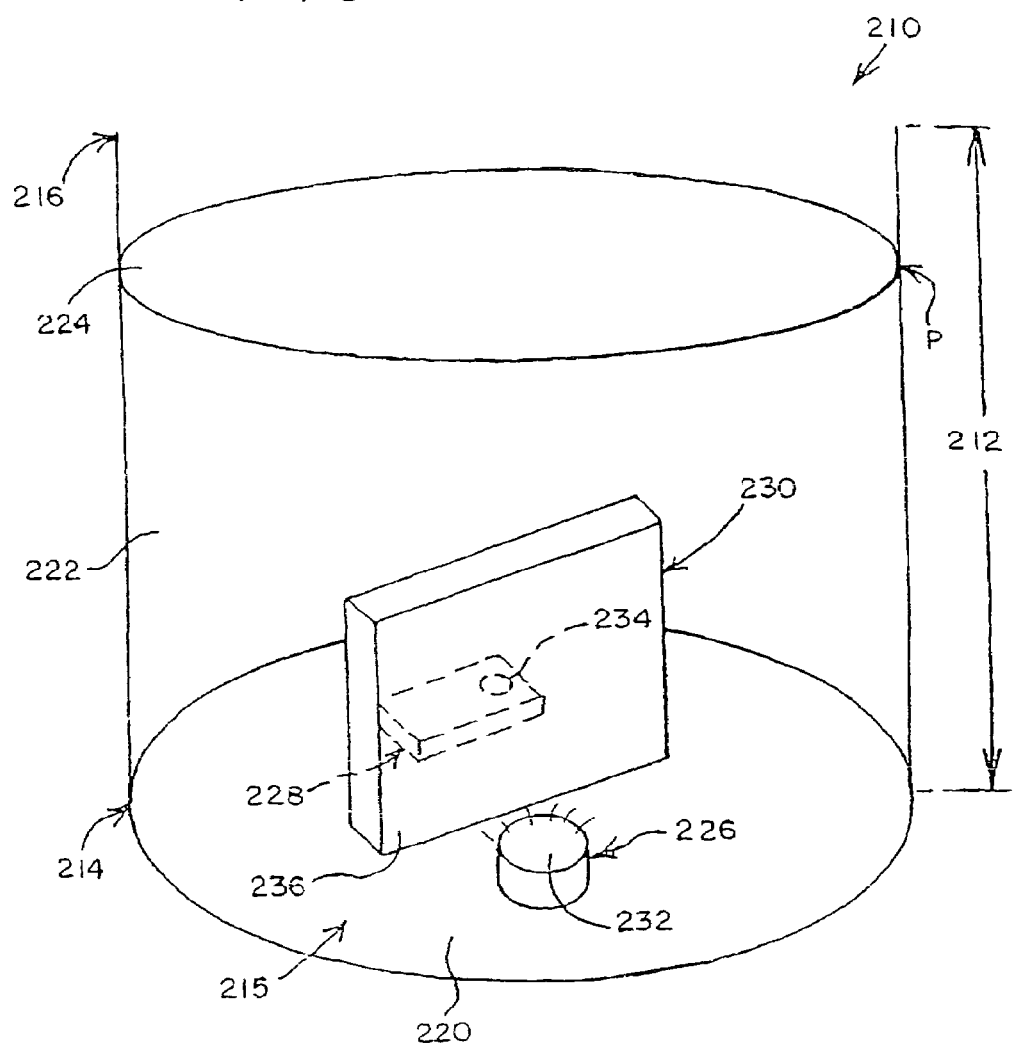
FIG. 4 illustrates a perspective view of a compartment with a movable element, a light source and a light sensor in an embodiment of the present invention.

FIGS. 3 and 4 illustrate a compartment 210 which may have a length 212 defined between a first end 214 and a second end 216. The second end 216 is opposite to the first end 214. The first end 214 and/or the second end 216 may have a first wall 215 and/or a second wall 217, respectively. The compartment 210 may have an interior surface 220 which may define an interior 222. The first wall 215 and/or the second wall 217 may be perpendicular to the interior surface 220 and/or may substantially enclose the compartment 210. The compartment 210 may be a type of cylinder, such as, for example, a hydraulic cylinder, a pneumatic cylinder and/or the like. The compartment 10 may be, for example, a hollow tube and/or the like. The present invention should not be deemed as limited to a specific embodiment of the type of the cylinder of the compartment 210.

The compartment 210 may have a movable element 224 which may be position and/or may be located in the interior 222 of the compartment 210. The movable element 224 may move in the interior 222 of the compartment 210 between the first end 214 and the second end 216. The movable element 224 may move to, may be positioned at and/or may be located at a position P in the interior 222 of the compartment 210 between the first end 214 and the second end 216. The movable element 224 may be, for example, a piston, a sphere, a tab, a flange, a spring, a magnet, a closed tube and/or the like. The present invention should not be deemed as limited to a specific embodiment of the movable element 224. It should be understood that the movable element 224 may be any movable element as known to one of ordinary skill in the art.

The interior 222 of the compartment 210 may have a light source 226, a light sensor 228 and/or a base 230. The base 230 may be located between the light source 226 and the light sensor 228. The light source 226, the light sensor 228 and/or the base 230 may be positioned on the interior surface 220 on the first end 215 of the compartment 210 and/or within the interior 222 of the compartment 210. The light source 226 may have a light emitting portion 232 directed inwardly with respect to the interior 222 of the compartment 210 as shown in FIG. 4. The light source 226 may project and/or may emit light into the interior 222 of the compartment 210. The light emitting portion 232 of the light source 226 may be, for example, an light emitting diode (hereinafter "LED"), a halogen light, a fluorescent light, an incandescent light, a neon light and/or the like. The present invention may not be deemed as limited to a specific embodiment of the light source 226. It should be understood that the light source 226 may be any light source capable of projecting and/or of emitting light into the interior 222 of the compartment 210 as known to one of ordinary skill in the art.

The light sensor 228 may have a detecting portion 234 directed inwardly with respect to the interior 222 of the compartment 210 as shown in FIG. 4. The light sensor 228 may detect, may determine and/or may measure an intensity of the emitted light into the interior 222 of the compartment 210 via the detecting portion 234. Further, the light sensor 228 may detect, may determine and/or may measure a strength of the light emitted into the interior 222 of the compartment 210 via the detecting portion 234. It should be understood that the light sensor 228 may be any light sensor capable of detecting, of determining and/or of measuring the intensity of the emitted light and/or the strength of the emitted light within the interior 222 of the compartment 210 as known to one of ordinary skill in the art.

As illustrated in FIG. 3, the light source 226 may be attached to and/or may be connected to a first side 236 of the base 230. The light sensor 228 may be attached to and/or may be connected to a second side 238 of the base 230. The first side 236 is opposite to the second side 238 of the base 230. The base 230 may be attached and/or connected to the interior surface 220 of the compartment 210. Supports 240a-240d may be attached to the interior surface 220 and/or the base 230. As a result, the light source 226, the light sensor 228 and/or the base 230 may be attached to and/or may be connected to the interior surface 220 of the compartment 210. Further, the light source 226, the light sensor 228 and/or the base 230 may be located within the interior 222 of the compartment 210 via the supports 240a-240d. The supports 240a-240d may be, for example, a bar, a rod, a wire, a cable, a shaft, a pole and/or the like. The base 230 and/or the supports 240a-240b may reduce, may minimize and/or may prevent diffraction of the light within the compartment 210. The present invention may not be deemed as limited to a specific embodiment of the supports 240a-240d. It should be understood that the supports 240a-240d may have any support capable of attaching and/or connecting the base 230 to the interior surface 220 as known to one of ordinary skill in the art.

As illustrated in FIG. 4, the light source 226, the light sensor 228 and/or the base 230 may be attached to the first wall 215. The base 230 may be located between the light source 226 and the light sensor 228. The light source 226 may be adjacent to first side 236 of the base 230. The light sensor 228 may be adjacent to the second side 238 of the base 230. As illustrated in FIGS. 3 and 4, the base 230 may be interposed between the light source 226 and the light sensor 228. The base 230 may prevent light emitted from the light source 226 from being directed towards the light sensor 228. As a result, the light sensor 228 may detect an intensity of light within the interior 222 of the compartment 210. Further, the base 230 may prevent the light emitting portion 232 from being directed towards the light sensor 228.

In an embodiment, a cover 233 may be applied to, may be attached to and/or may be connected to the light emitting portion 232 of the light source 226 as shown in FIG. 4. The cover 233 on the light emitting portion 232 may be adjacent to the light sensor 228 within the interior 222 of the compartment 210. The cover 233 may prevent the light transmitted from the light source 226 from being directed towards the light sensor 228. In an embodiment, the cover 233 may be, for example, a paint which may be applied to the light emitting source 232 of the light source 226. In another embodiment, the cover 233 may be made from a material, such as, for example, plastic, a film and/or an acrylic. It should be understood that the cover 233 may be any cover capable of preventing the light transmitted from the light source 226 from being directed towards the light sensor 228 as known to one of ordinary skill in the art.

The compartment 210, the interior surface 220 of the compartment 210, the base 230, the supports 240a-240d and/or the movable element 224 may be made from a material which may absorb, may diffuse and/or may scatter an amount of the light emitted from the light source 226 and/or may have light absorbing properties. The present invention should not be deemed as limited to a specific material of the compartment 210, the interior surface 220 of the compartment 210, the base 230, the supports 240a-240d and/or the movable element 224. The material may reduce, may minimize and/or may prevent diffraction of the light within the interior 222 of the compartment 210. It should be understood that the material may be any material and/or any compound which may have light absorbing properties, light diffusing properties and/or light attenuating properties as known to one of ordinary skill in the art.

As the movable element 224 may transpose and/or may move through the compartment 210, a portion of the light emitted from the light source 226 may be absorbed by, may be diffused by, may be attenuated by and/or may be scattered by the movable element 224, the base 230, the supports 240a-240d and/or the interior surface 220 of the compartment 210 between the movable element 224 and the first end 215 of the compartment 210. The portion of the emitted light which may be absorbed by, may be diffused by, may be attenuated and/or may be scattered by the interior surface 220, the base 230, the supports 240a-240d and/or the movable element 226 may be based on the light absorbing properties of the material of the compartment 210, the base 230, the support 240a-240d and/or the movable element 224. As a result, the interior surface 220, the base 230, the supports 240a-240d and/or the movable element 226 may attenuate the light within the compartment 210. The light sensor 228 may detect, may determine and/or may measure an intensity of the emitted light within the interior 222 of the compartment 210 which may not be absorbed by, which may be diffused by and/or may be scattered by the movable element 224, the base 230, the supports 240a-240d and/or the interior surface 220 between the movable element 224 and the first end 215 of the compartment 210. The intensity of the emitted light in the interior 222 of the compartment 210 may not include the portion of light which may be absorbed by, may be diffused by, may be attenuated and/or may be scattered by the movable element 224, the base 230, the supports 240a-240d and/or the interior surface 220 between the movable element 224 and the first end 215 of the compartment 210.

Figure 5:
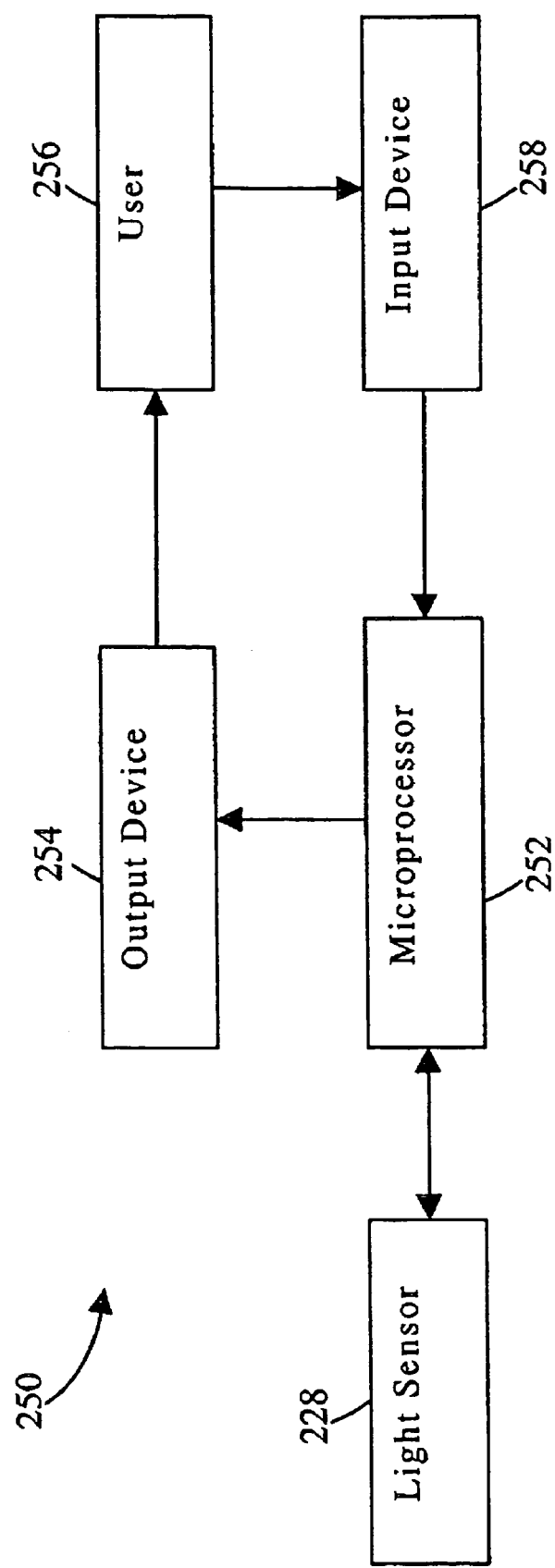
FIG. 5 illustrates a black box diagram of a system in another embodiment of the present invention.

FIG. 5 illustrates, in a black box diagram, an embodiment of a system 250 of the present invention. The light sensor 228 may be connected to and/or may be in communication with a microprocessor 252. The microprocessor 252 may be local with respect to and/or may be remote with respect to the light sensor 228. The light sensor 228 may detect, may measure and/or may determine the intensity of light emitted within the interior 222 of the compartment 210 which may not be absorbed by, which may be diffused by and/or may be scattered by the movable element 224, the base 230, the supports 240a-240d and/or the interior surface 220 between the movable element 224 and the first end 215 of the compartment 210. The position P of the movable element 224 in the interior 222 of the compartment 210 may correspond to, may relate to and/or may be indicative of the intensity of the emitted light detected by the light sensor 228 within the interior 222. The light sensor 228 may detect, may measure and/or may determine the intensity of the emitted light within the interior 222.

The light sensor 228 may transmit, may send and/or may communicate position information to the microprocessor 252. The position information may relate to, may be based on, may correspond to and/or may be indicative of the intensity of the emitted light detected by the light sensor 228 and/or the position P of the movable element 224. The microprocessor 252 may be programmed to process the position information received from the light source 228. The microprocessor 252 may be programmed to measure, to determine and/or to identify the position P of the movable element 224 in the interior 222 of the compartment 210 based on the position information received from the light sensor 228.

The microprocessor 252 may be connected to and/or may be in communication with an output device 254. The output device 254 may be local with respect to and/or may be remote with respect to the microprocessor 252 and/or the light sensor 228. The output device 254 may be a printer, a monitor, a handheld device, a speaker and/or the like. An output device 254 may display, may indicate and/or may render display information to a user 256. The display information may relate to, may correspond to and/or may be based on the position information, the intensity of light emitted and/or the position P of the movable element 224. The output device 254 may print a graph, a display, a chart and/or the like for illustrating the display information to the user 256. It should be understood that the output device 254 may be any output device capable of communicating the display information to the user 256 known to one of ordinary skill in the art.

The display information may be, for example, logarithmic, linear and/or the like. Further, the display information may be in one or more formats, such as, for example, voltages, currents, pulses, numbers and/or the like. The microprocessor 252 may be programmed to convert, to format and/or to transform the display information between one or more formats. The present invention should not be deemed as limited to a specific embodiment of the one or more formats of the display information. It should be understood that the format of the display information may be any format known to one of ordinary skill in the art.

An input device 258 may be connected to and/or in communication with the microprocessor 252. The input device 258 may be utilized by the user 256 to operate, to control and/or to instruct the microprocessor 252. The input device 258 may be a keyboard, a handheld device, a wireless portable device, a dial, a switch and/or the like. The input device 258 may be remote with respect to the microprocessor 252 and/or the output device 254. The microprocessor 252 may be programmed to receive instructions from the user 256 via the input device 258. The user 256 may select and/or may control the output device 254, the display information and/or the one or more formats of the display information via the input device 258. The present invention should not be deemed as limited to a specific embodiment of the input device 258. It should be understood that the input device 258 may be any input device capable of communicating instructions to the microprocessor 252.

Figure 6:
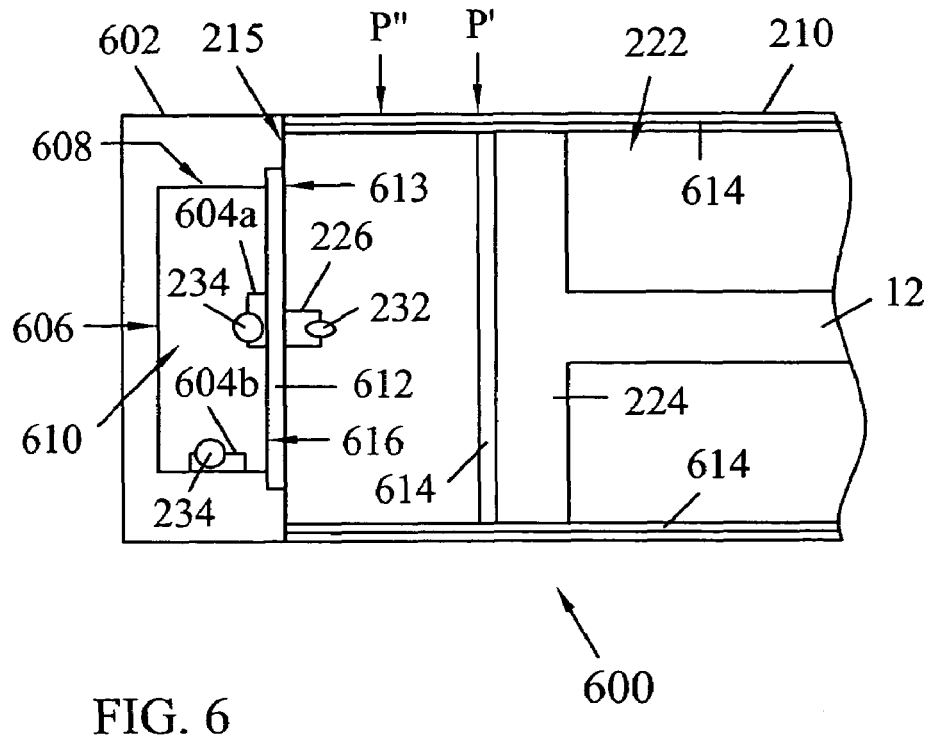
FIG. 6 illustrates a cross-sectional view of a compartment and an end cap having a movable element in an embodiment of the present invention.

In an embodiment, FIG. 6 illustrates a system 600 for measuring and/or for detecting an intensity of the light within the compartment 210 which may correspond to a first position P' or a second position P'' of the movable element 224 within the interior 222 of the compartment 210. The system 600 may have the movable element 224 which may be positioned at and/or may be located within the interior 222 of the compartment 210. The movable element 224 may move within the interior 222 of the compartment 210 in a first direction and/or in a second direction via the shaft 12. The movable element 224 may move to, may be positioned at and/or may be located at the first position P' or at the second position P'' in the interior 222 of the compartment 210 with respect to the first wall 215 of the compartment 210.

Figure 7:
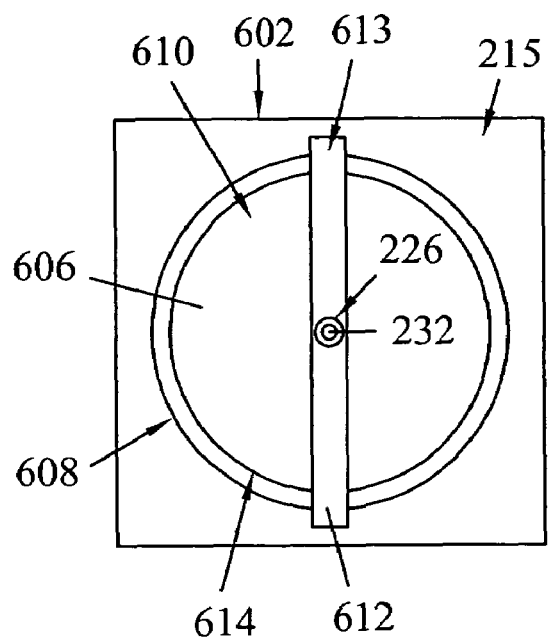
FIG. 7 illustrates a top plan view of an end cap of a compartment in an embodiment of the present invention.

The first wall 215 of the compartment 210 may have an end cap 602 which may be adjacent to the interior 222 of the compartment 210 as illustrated in FIGS. 6 and 7. Movement of the movable element 224 in the first direction or in the second direction may move the movable element 224 inwardly or outwardly with respect to the first wall 215 of the compartment 210. The end cap 602 may support, may store and/or may contain the light source 226 and a first light sensor 604a and/or a second light sensor 604b (collectively known hereinafter as "the light sensors 604a, 604b") for emitting light and/or for detecting an intensity of the light within the interior 222 of the compartment 210, respectively. The light emitting portion 232 of the light source 226 may be directed towards and/or may be located within the interior 222 of the compartment 210 for emitting and/or for transmitting the light into the interior 222 of the compartment 210 as shown in FIG. 6. As a result, the light source 226 may project, may transmit and/or may emit the light into the interior 222 of the compartment 210.

The end cap 602 may have a bottom surface 606 and interior walls 608 as illustrated in FIGS. 6 and 7. The interior walls 608 may be attached to and/or may be connected to the bottom surface 606 and/or may extend outwardly with respect to the bottom surface 606. The bottom surface 606 and the interior walls 608 may form and/or may define an interior 610 of the end cap 602. The end cap 602 may be attached to, may be connected to and/or may be adjacent to the first wall 215 of the compartment 210 as shown in FIG. 6. As a result, the interior 610 of the end cap 602 may be accessible from the interior 222 of the compartment 210. Alternatively, the interior 222 of the compartment 210 may be accessible from the interior 610 of the end cap 602. Moreover, the end cap 602 may enclose the interior 222 of the compartment 210 to seal the compartment 210.

The end cap 602 may have a platform 612 which may be attached to and/or may be connected to the interior walls 608 of the end cap 602. As shown in FIG. 6, the platform 612 may have a first side 613 and a second side 616 which is opposite to the first side 613. The platform 612 may extend across the interior 610 of the end cap 602 and/or between the interior walls 608 of the end cap 602. The first side 613 of the platform 612 may be adjacent to the interior 222 of the compartment 210. The second side 616 of the platform 612 may be adjacent to the interior 610 of the end cap 602 and/or the bottom surface 606 of the end cap 602. Further, the platform 612 may be located between and/or may be positioned between the interior 610 of the end cap and the interior 222 of the compartment 210.

The light source 226 may be attached to, may be connected to and/or may be positioned on the first side 613 of the platform 612. As a result, the light source 226 may extend inwardly with respect to the interior 222 of the compartment 210 as shown in FIGS. 6 and 7. The light emitting portion 232 of the light source 226 may transmit, may project and/or may emit light into the interior 222 of the compartment 210. As a result, light from the light source 226 may be transmitted into the interior 222 of the compartment 210 from the platform 612 of the end cap 602. The light transmitted into the interior 222 of the compartment may be transferred to, may be transmitted to and/or may projected into the interior 610 of the end cap 602. As a result, the light within the interior 610 of the end cap may correspond to, may be based on and/or may be associated with the light within the interior 222 of the compartment 210.

The first light detector 604a may be attached to, may be connected to and/or may be positioned on the second side 616 of the platform 612 as shown in FIG. 6. The platform 612 may be located between and/or may be positioned between the light source 226 and the first light detector 604a. As a result, the first light detector 604a may be separated from the light source 226 by the platform 612 of the end cap 602. The platform 612 may prevent and/or may block the light being transmitted by the light source 226 from being directed towards or inwardly with respect to the first light detector 604a. In an embodiment, the cover 233 may be applied to the light source 226 to prevent the light being transmitted from the light source 226 from being directed towards the first light detector 604a and/or the second light detector 604b. The second light detector 604b may be attached to, may be connected to and/or may be adjacent to the interior walls 608 of the end cap 602. The second light detector 604b may be located between and/or may be positioned on the interior walls 608 of the end cap 602 between the platform 612 and the bottom surface 606 of the end cap 602. The platform 612 may be located between and/or may be positioned between the light source 226 and the second light detector 604b. As a result, the light source 226 and the second light detector 604b may be separated by the platform 612 of the end cap 602 and/or by the cover 233 of the light source 226. The platform 612 and/or the cover 233 may prevent and/or may block light being transmitted by the light source 226 from being directed towards or inwardly with respect to the second light detector 604b.

The light detectors 604a, 604b may have the detecting portion 234 for detecting and/or for measuring an intensity of the light which may be transmitted by the light source 226. The detecting portion 234 of the light detectors 604a, 604b may be located within, may be directed inward and/or may be positioned within the interior 610 of the end cap 602. The light detectors 604a, 604b may measure, may determine, may identify and/or may detect an intensity of light emitted within the interior 610 of the end cap 602 via detecting portion 234. Further, the light sensors 604a, 604b may detect, may determine and/or may measure a strength of the light emitted into the interior 222 of the compartment 210 via the detecting portion 234.

The intensity of the light within the interior 601 of the end cap 602 may correspond to, may be based on and/or may be associated with an intensity of light within the interior 222 of the compartment 210. As a result, the light detectors 604a, 604b may measure, may determine, may identify and/or may detect the intensity of the light within the interior 222 of the compartment 210 via the intensity of light within the interior 610 of the end cap 602. The intensity of and/or the strength of the light emitted into the interior 610 of the end cap 602 may correspond to the first position P' or the second position P''' of the movable element 224 within the interior 222 of the compartment 210. As a result, the light detectors 604a, 604b may determine and/or may detect that the movable element 224 which may be in the first position P' or in the second position P''' within the interior 222 of the compartment 210. The light detectors 604a, 604b may identify the first position P' or the second position P''' of the movable element 224 via the intensity of light emitted within the interior 610 of the end cap 602.

In an embodiment, a driver (not shown in the figures) may be connected to and/or may be in communication with the light source 226 to maintain, to stabilize and/or to control the light emitted from the light source 226 into the interior 222 of the compartment 210 and/or the interior 610 of the end cap 602. As a result, the light emitted by the light source 226 may be, for example, constant, consistent, uniform and/or continuous. The light emitted from the light source 226 may have a color, such as, for example, red, yellow, green, blue or white for illuminating the interior 222 of the compartment 210. The present invention should not be deemed as limited to a specific embodiment of the color of the light emitted from the light source 226.

The bottom surface 606 of the end cap 602 may have reflective characteristics for reflecting, for diffusing and/or for scattering the light within the interior 610 of the end cap 602 towards the light detectors 604a, 604b. The bottom surface 606 may attenuate the light within the interior 610 of the end cap 602. In an embodiment, the bottom surface 606 may be a reflective surface, such as, for example, a mirror and/or the like. The bottom surface 606 may reflect, may diffuse and/or may scatter and/or may focus the light within the interior 610 of the end cap 602 inwardly with respect to the light detectors 604a, 604b within the interior 610 of the end cap 602. As a result, the light detectors 604a, 604b may measure and/or may detect the intensity of the light within the interior 610 of the end cap 602 via the reflective surface 606 of the end cap 602.

A surface 614 may be formed on the compartment 210 and/or the movable element 224 which may be adjacent to the interior 222 of the compartment 210 for absorbing an amount of the light emitted within the interior 222 of the compartment 210. The surface 614 may be, for example, a coating, a finish, a texture, a light absorbing substance and/or the like. The surface 614 may be uniform, may be symmetric and/or may be continuous with respect to the interior 222 of the compartment 210 for absorbing and/or for reflecting the amount of the light emitted from the light source 226. In an embodiment, the surface 614 of the movable element 224 and/or of the compartment 210 may be made from a first light absorbing material and/or a second light absorbing material, respectively. As a result, the surface 614 may absorb, may diffuse and/or may scatter the light within the interior 222 of the compartment 210. Moreover, the surface 614 may attenuate the light within the interior 222 of the compartment 210.

In an embodiment, the surface 614 may be, for example, a nitrile compound and/or a ceramic compound which may have light absorbing properties and/or light absorbing characteristics. The surface 614 of the compartment 210 and/or the movable head 224 may have various colors which may affect and/or control the amount of the light which may be absorbed, may be diffused and/or may be scattered within the interior 222 of the compartment 210. The surface 614 may attenuate, may absorb, may diffuse and/or may scatter the amount of the light emitted within the interior 222 of the compartment 210 for determining that the movable element 224 may be at the first position P' and/or at the second position P''' within the interior 222 of the compartment 210. It should by understood that the surface 614 may be any surface which may have light diffusing properties, light attenuating properties, light absorbing properties and/or light absorbing characteristics as known to one of ordinary skill in the art.

In an embodiment, the surface 614 of the movable element 224 and/or of the compartment 210 may be formed by applying a coarse material (not shown in the figures), such as, for example, a sand paper to the surface 614. The coarse material may roughen, may scratch and/or may damage the movable element 224 and/or the compartment 210 to form the surface 614 on the movable element 224 and/or the compartment 210, respectively. As a result, the surface 614 of the movable element 224 and/or the compartment 210 may have, for example, the light absorbing properties, light diffusing properties, light attenuating properties and/or the light absorbing characteristics to absorb the amount of the light emitted within the interior 222 of the compartment 210.

The light within the interior 222 of the compartment 210 which may not have been absorbed by, may have been diffused by and/or may have been scattered by the surface 614 of the compartment 210 and/or of the movable element 224 may illuminate the interior 610 of the end cap 602. As a result, the light within the interior 610 of the end cap may correspond to the light within the interior 222 of the compartment 210 which may not have been absorbed by the surface 614 of the compartment 210 and/or of the movable element 224. The intensity of the light within the interior 610 of the end cap 602 may correspond to and/or may be based on the intensity of the light emitted within the interior 222 of the compartment 210 which may not have been absorbed by the surface 614 of the compartment 210 and/or of the movable element 224. The intensity of the light within the interior 610 of the end cap 602 may correspond to and/or may be based on the first position P' and/or the second position P'' of the movable element 224 within the interior 222 of the compartment 210. As a result, the light detectors 604a, 604b may determine that the movable element 224 may be at the first position P' or at the second position P'' based on the intensity of the light within the interior 610 of the end cap 602.

The bottom surface 606 of the end cap 602 may reflect, may diffuse and/or may attenuate the light within the interior 610 of the end cap 602 which may be received from, may be transmitted from and/or may be projected from the interior 222 of the compartment 210 inwardly with respect to the light detectors 604a, 604b. The light detectors 604a, 604b may detect and/or may measure the intensity of the emitted light within the interior 610 of the end cap 602 via the bottom surface 606 of the end cap 602. As a result, the light detectors 604a, 604b may determine, may identify and/or may locate the first position P' and/or the second position P'' of the movable element 224 based on the intensity of the light within the interior 610 of the end cap 602.

Figure 8:
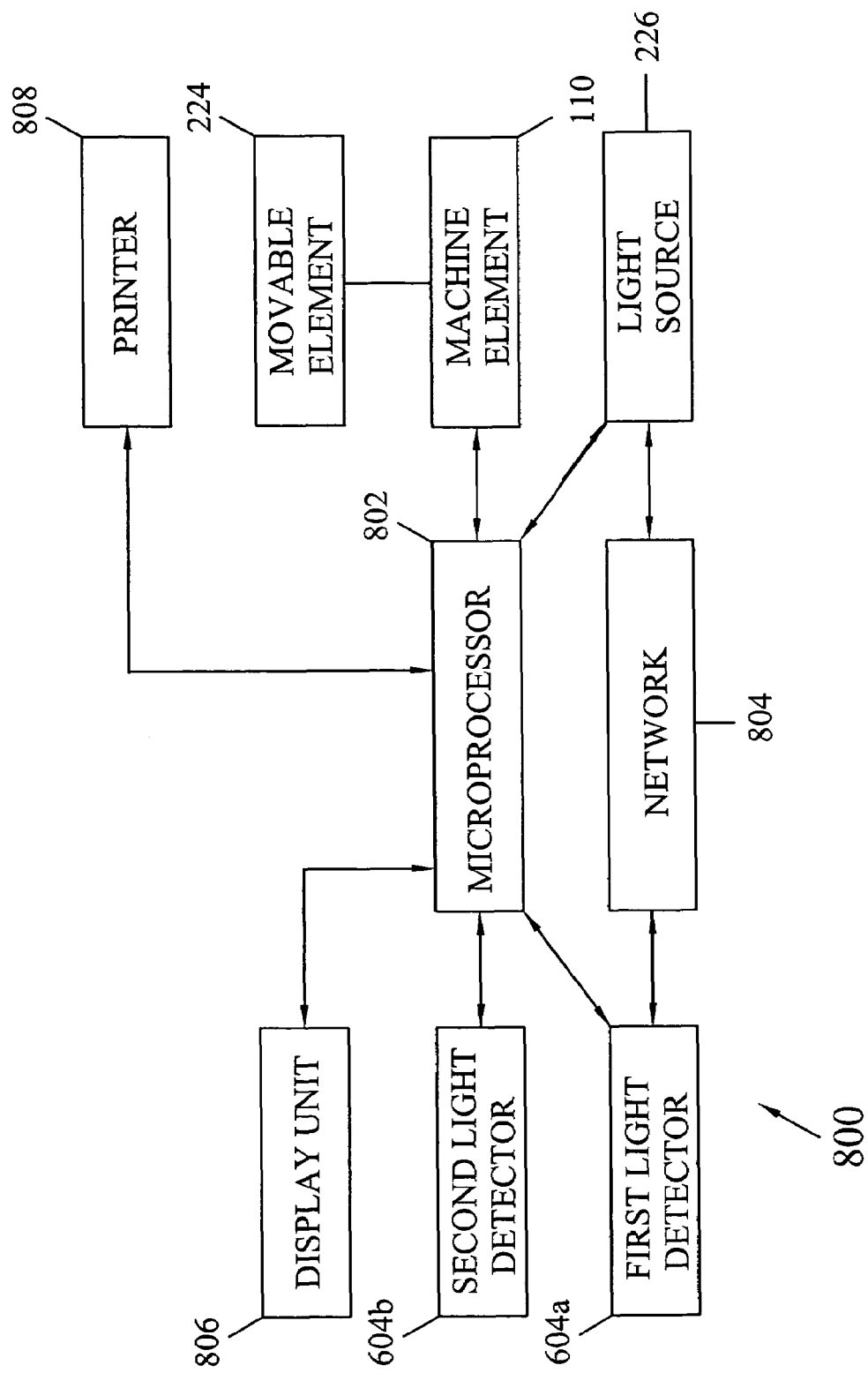
FIG. 8 illustrates a black box diagram of a system in an embodiment of the present invention.

FIG. 8 illustrates, in a black box diagram, an embodiment of a system 800 of the present invention. The system 800 may have the light source 226 and/or the light detectors 604a, 604b which may determine, may measure and/or may identify the intensity of the light within the interior 610 of the end cap 602 that may not be absorbed by, that may have been diffused by and/or may have been scattered by the surface 614 of the movable element 224 and/or of the compartment 210 within the interior 222 of the compartment 210. An output signal from the light detectors 604a, 604b may be transmitted to a microprocessor 802 for signal interpretation and/or processing. The microprocessor 802 may determine, may identify and/or may detect the first position P' and/or the second position P'' of the movable element 224 within the interior 222 of the compartment 210. As a result, the microprocessor 802 may locate the movable element 224 within the interior 222 of the compartment 210 based on the intensity of the light that may not be absorbed by, may have been diffused by and/or may have been attenuated by the surface 614 of the movable element 224 and/or of the compartment 210.

The microprocessor 802 may be located locally with respect to the compartment 210, the light source 226 and/or the light detectors 604a, 604b. The microprocessor 802 may be connected to and/or may be in communication with the light source 226 and/or the light detectors 604a, 604b. In an embodiment, the microprocessor 802 may be located remotely with respect to the compartment 210, the light source 226 and/or the light detectors 604a, 604b. The microprocessor 802 may be connected to and/or may be in communication with the light source 226 and/or the light detectors 604a, 604b via a data communication network 804 (hereinafter "the network 804"). The microprocessor 802 may be programmed to operate, to activate and/or to deactivate the machine element 110 to move the movable element 224 to the first position P' and/or the second position P''' within the interior 222 of the compartment 210. The microprocessor 802 may instruct and may control the machine element 110 for moving the movable element 224 to the first position P' and/or to the second position P'''. As a result, the machine element 110 may move the movable element 224 to the first position P' or to the second position P''' within the interior 222 of the compartment 210.

The network 804 may be a fixed network, such as, for example, a cabled network, a permanent network and/or the like. The network 804 may be a temporary network, such as, for example, a modem network, a null modem network and/or the like. The network 804 may be, for example, a local area network, a metropolitan area network, a wide area network, a personal area network and/or the like. Alternatively, the network 804 may be a wireless network, such as, for example, a wireless metropolitan area network, a wireless local area network, a wireless personal area network, a global standard network, a personal communication system network, a pager-based service network, a general packet radio service, a universal mobile telephone service network, a radio access network and/or the like. The present invention should not be limited to a specific embodiment of the network 804. It should be understood that the network 804 may be any network capable of transferring and/or of transmitting output signal as known to one having ordinary skill in the art.

A display unit 806 and/or a printer 808 may be connected to the network 804 and/or to the microprocessor 802. The display unit 806 and/or the printer 808 may be located remotely or may be located locally with respect to the microprocessor 802 and/or with respect to the compartment 210. The display unit 806 and/or the printer 808 may display and/or may render information and/or data to a user (not shown in the figures) which may relate to the first position P' of the movable element 224, the second position P''' of the movable element 224, the intensity of the light within the interior 610 of the end cap 602 and/or the intensity of the light within the interior 222 of the compartment 210 that may not be absorbed by the surface 614 of the movable element 224 and/or of the compartment 210. It should be understood that the display unit 806 and/or the printer 108 may be any display unit and/or any printer, respectively, that may be capable of displaying and/or rendering the information and/or the data to the user.

The various embodiments of the present invention may be operated by any power supply known by those skilled in the art. In addition, the various embodiments may be operated in and/or may be operated from remote locations through the use of an electric generator, a pressurized air line, or the like.

The light detectors 604a, 604b may detect the intensity of light within the interior 222 of the compartment 210 and/or of the end cap 602 to located the first position P' and/or the second position P''' of the movable element 224 within the interior 222 of the compartment 210. The platform 612 may be attached to the interior walls 608 of the end cap 602 for positioning the light source 226 within the interior 222 of the compartment 210 and the first light detector 604a within the interior 610 of the end cap 602. The second light detector 604b may be attached to the interior walls 608 of the end cap 602 which may be adjacent to the platform 612. The platform 612 may be located between the light source 226 and the light detectors 604a, 604b to prevent light transmitted by the light source 226 from being directed inwardly with respect to the light detectors 604a, 604b. The bottom surface 606 of the end cap 602 which may reflect, may diffuse and/or may scatter the light within the interior 610 of the end cap 602 inwardly with respect to the light detectors 604a, 604b. The light detectors 604a, 604b may measure and/or may detect the intensity of the light within the interior 610 of the end cap 602 which may not be absorbed by the movable element 224 and/or by the compartment 210. The intensity of the light detectable by the light detectors 604a, 604b may correspond to the position of the movable element 224 within the interior 222 of the compartment 210.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A system for detecting light, the system comprising:
   a compartment having a body defining an interior wherein the body has an interior surface and a length defined between a first end and a second end of the compartment;
   a cap having a bottom surface and walls wherein the walls are connected to the bottom surface wherein the cap is connected to the first end of the compartment;
   a platform attached to the walls of the cap wherein the platform is located at the first end of the compartment wherein the bottom surface of the cap, the walls of the cap and the platform define an interior of the cap wherein the interior of the compartment is adjacent to the interior of the cap wherein the platform is located between the interior of the compartment and the interior of the cap;
   a light source connected to the platform wherein the light source is located within the interior of the compartment wherein the light source emits light into the interior of the compartment wherein the interior surface of the compartment absorbs and diffuses an amount of the light emitted from the light source within the interior of the compartment; and
   a first detector located within the interior of the cap wherein the first detector detects an intensity of the light within the interior of the cap wherein the intensity of the light within the interior of the cap corresponds to an intensity of the light within the interior of the compartment which is not absorbed or diffused by the interior surface of the compartment and further wherein the intensity of the light with the interior of the compartment corresponds to the amount of the light not absorbed or diffused by the interior surface of the compartment wherein the cap and the compartment prevents diffraction of the light within the interior of the compartment and the interior of the cap.

2. The system of claim 1 further comprising:
   a movable element within the interior of the compartment wherein a position of the movable element within the interior of the compartment corresponds to the intensity of the light detected by the first sensor.

3. The system of claim 1 further comprising:
   a second detector located within the interior of the cap wherein the second detector measures the intensity of the light within the interior of the cap.

4. The system of claim 1 wherein the first detector is connected to the platform.

5. The system of claim 1 wherein the first detector is connected to a first side of the platform, the light source is connected to a second side of the platform and the first side is located in a position opposite to the second side.

6. The system of claim 1 further comprising:
   a microprocessor connected to the first detector wherein the microprocessor is in communication with the first detector.

7. The system of claim 1 further comprising:
   a coating on the interior surface of the compartment wherein the coating absorbs or diffuses the amount of the light emitted from the light source.

8. A system for detecting light, the system comprising: a compartment having a body defining an interior wherein the body has an interior surface and a length defined between a first end and a second end of the compartment wherein the compartment has a movable element within the interior of the compartment wherein the movable element moves within the interior of the compartment from a first position to a second position wherein the interior surface prevents diffraction of light emitted within the interior of the compartment; a cap having bottom surface and walls wherein the walls are connected to the bottom surface wherein the cap is connected to the first end of the compartment; a platform attached to the walls of the cap wherein the platform is located at the first end of the compartment wherein the bottom surface of the cap, the walls of the cap and the platform define an interior of the cap; a first light detector located within the interior of the cap wherein the platform is located between the interior of the compartment and the first detector; and a second light detector connected to the walls of the cap wherein the second detector is located within the interior of the cap wherein the first detector or the second detector detects an intensity of the light within the interior of the cap wherein the intensity of the light within the interior of the cap corresponds to the first position or the second position of the movable element within the interior of the cap; and wherein the first detector is connected to the platform.

9. The system of claim 8 further comprising:
   a surface formed on the movable element wherein the surface absorbs or diffuses an amount of light within the interior of the compartment.

10. The system of claim 8 wherein the bottom surface reflects or diffuses the light within the interior of the cap inwardly with respect to the first detector or the second detector.

11. The system of claim 8 further comprising:
    a light source connected to the platform wherein the light source emits light within the interior of the compartment.

12. The system of claim 8 further comprising:
    a coating on the interior surface of the compartment wherein the coating absorbs and diffuses the amount of the light emitted from the light source.

13. The system of claim 8 wherein the first detector is attached to a first side of the platform, a light source is connected to a second side of the platform and the first side is located in a position opposite to the second side.

14. A method for detecting light, the method comprising the steps of:
    providing a compartment having a body defining an interior wherein the body has an interior surface and a length defined between a first end and a second end;

positioning a movable element within the interior of the compartment wherein the movable element is located at a first position within the interior with respect to the second end of the compartment wherein the movable element and the interior surface of the compartment attenuate light emitted within the interior of the compartment;

connecting a cap to the first end of the compartment wherein the cap has a bottom surface and walls;

connecting a platform at the first end of the apartment wherein the bottom surface, the walls and the platform define an interior of the cap wherein the platform is located between the interior of the compartment and the interior of the cap wherein the walls of the cap diffuse light emitted within the interior of the cap;

connecting a first light detector to the platform wherein the first light detector is located within the interior of the cap; and detecting an intensity of the light within the interior of the cap wherein the intensity of the light corresponds to an amount of the light not absorbed or diffused by the interior surface of the compartment wherein the amount of the light not absorbed or diffused by the interior surface of the compartment corresponds to the first position of the movable element within the interior of the compartment.

15. The method of claim 14 further comprising the step of:
connecting a second light detector to the walls of the cap wherein the second light detector is located within the interior of the cap.

16. The method of claim 14 further comprising the step of:
moving the movable element from the first position to a second position with respect to the interior of the compartment.

17. The method of claim 14 further comprising the step of:
connecting a light source to the platform wherein the light source emits light within the interior of the compartment.

18. The method of claim 14 further comprising the steps of:
attaching the first detector to a first side of the platform; and
attaching a light source to a second side of the platform wherein the first side is located in a position opposite to the second side.

19. The method of claim 14 further comprising the step of:
forming a surface on the interior surface of the compartment or the movable element wherein the surface attenuates the light emitted within the interior of the compartment.

* * * * *